United States Patent
Eichelberger

(10) Patent No.: US 10,221,601 B2
(45) Date of Patent: Mar. 5, 2019

(54) ARTICULATING FRICTION HINGE FOR A MOUNTABLE LIGHTING DEVICE

(71) Applicant: Streamlight, Inc., Eagleville, PA (US)

(72) Inventor: Cleatis Eichelberger, East Norriton, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 15/872,520

(22) Filed: Jan. 16, 2018

(65) Prior Publication Data

US 2018/0202207 A1     Jul. 19, 2018

Related U.S. Application Data

(60) Provisional application No. 62/446,662, filed on Jan. 16, 2017.

(51) Int. Cl.

| | |
|---|---|
| *F21S 4/00* | (2016.01) |
| *E05D 11/08* | (2006.01) |
| *F16M 13/02* | (2006.01) |
| *E05D 3/02* | (2006.01) |
| *E05D 5/12* | (2006.01) |
| *F16M 11/10* | (2006.01) |
| *F21V 23/04* | (2006.01) |
| *F21V 21/30* | (2006.01) |
| *F16M 13/04* | (2006.01) |
| *E05D 5/10* | (2006.01) |

(52) U.S. Cl.
CPC .............. *E05D 11/087* (2013.01); *E05D 3/02* (2013.01); *E05D 5/121* (2013.01); *F16M 11/10* (2013.01); *F16M 13/02* (2013.01); *F21V 21/30* (2013.01); *F21V 23/04* (2013.01); *E05D 2003/027* (2013.01); *E05D 2005/102* (2013.01); *E05Y 2600/50* (2013.01); *E05Y 2900/60* (2013.01); *F16M 13/04* (2013.01)

(58) Field of Classification Search
CPC ......... E05D 11/087; E05D 3/02; E05D 5/121; E05D 2005/102; F16M 11/10; F16M 13/02; F21V 21/30; F21V 23/04; E05Y 2900/60

See application file for complete search history.

(56) References Cited

U.S. PATENT DOCUMENTS

| | | | | |
|---|---|---|---|---|
| 5,467,479 | A * | 11/1995 | Mattes | A42B 3/04 2/422 |
| 9,194,548 | B2 * | 11/2015 | Janice | F21L 4/02 |
| 2009/0059607 | A1 | 3/2009 | Yoon | |
| 2009/0184646 | A1 | 7/2009 | Devaney et al. | |
| 2010/0254147 | A1 * | 10/2010 | Tsao | F21V 21/30 362/371 |
| 2015/0176781 | A1 | 6/2015 | Janice | |

FOREIGN PATENT DOCUMENTS

| | | |
|---|---|---|
| EP | 1541918 A2 | 6/2005 |
| WO | 2011100242 A1 | 8/2011 |

OTHER PUBLICATIONS

Streamlight Enduro LED Headlamp [online]. [Retrieved on Jan. 16, 2018]. Retrieved from the Internet: <https://www.streamlight.com/products/detail/index/enduro-led-headlamp>.

Korean Intellectual Patent Office, International Search Report and Written Opinion of the International Searching Authority, dated Jun. 20, 2018, for PCT/US2018/013852.

* cited by examiner

*Primary Examiner* — Evan Dzierzynski
(74) *Attorney, Agent, or Firm* — Design IP

(57) ABSTRACT

A lighting device comprising an improved hinge assembly, and methods of assembly thereof, are disclosed.

20 Claims, 6 Drawing Sheets

ARTICULATING FRICTION HINGE FOR A MOUNTABLE LIGHTING DEVICE

FIELD OF THE INVENTION

The present invention relates to the field of mountable lighting devices, and more particularly a portable, mountable lighting device having an articulating friction hinge that permits the lighting device to be mounted and articulated according to the user's needs and desired position.

BACKGROUND

Head-mountable lighting devices are well known in the art. These devices may be mounted to a helmet, hat, visor, or other mounting surface via a mounting clip, or around a user's head via the use of a headstrap. One such example is the Enduro Head-Mounted Flashlight, manufactured by Streamlight, Inc. of Eagleville, Pa., U.S.A., which is the applicant of the present application.

Many known head-mountable and surface-mountable lighting devices include a ratcheting hinge that permits only a finite number of lighting device positions with respect to the mounting portion of the device. This is a potential hindrance to a user, since the user may not be able to achieve a desired position for the lighting device. In addition, many of these prior art hinges function to hold the lighting device in the desired position via pressure applied to the hinge by a fastener (e.g., a nut and bolt combination). These prior art hinges will tend to work themselves loose over time and eventually fail.

Accordingly, there is a need for an improved articulating friction hinge for a mountable lighting device that overcomes these and other drawbacks of the prior art devices.

BRIEF DESCRIPTION OF THE DRAWINGS

The lighting device according to the present invention is further described with reference to the accompanying drawings, in which.

DETAILED DESCRIPTION OF THE PREFERRED EMBODIMENTS

Figure 1:
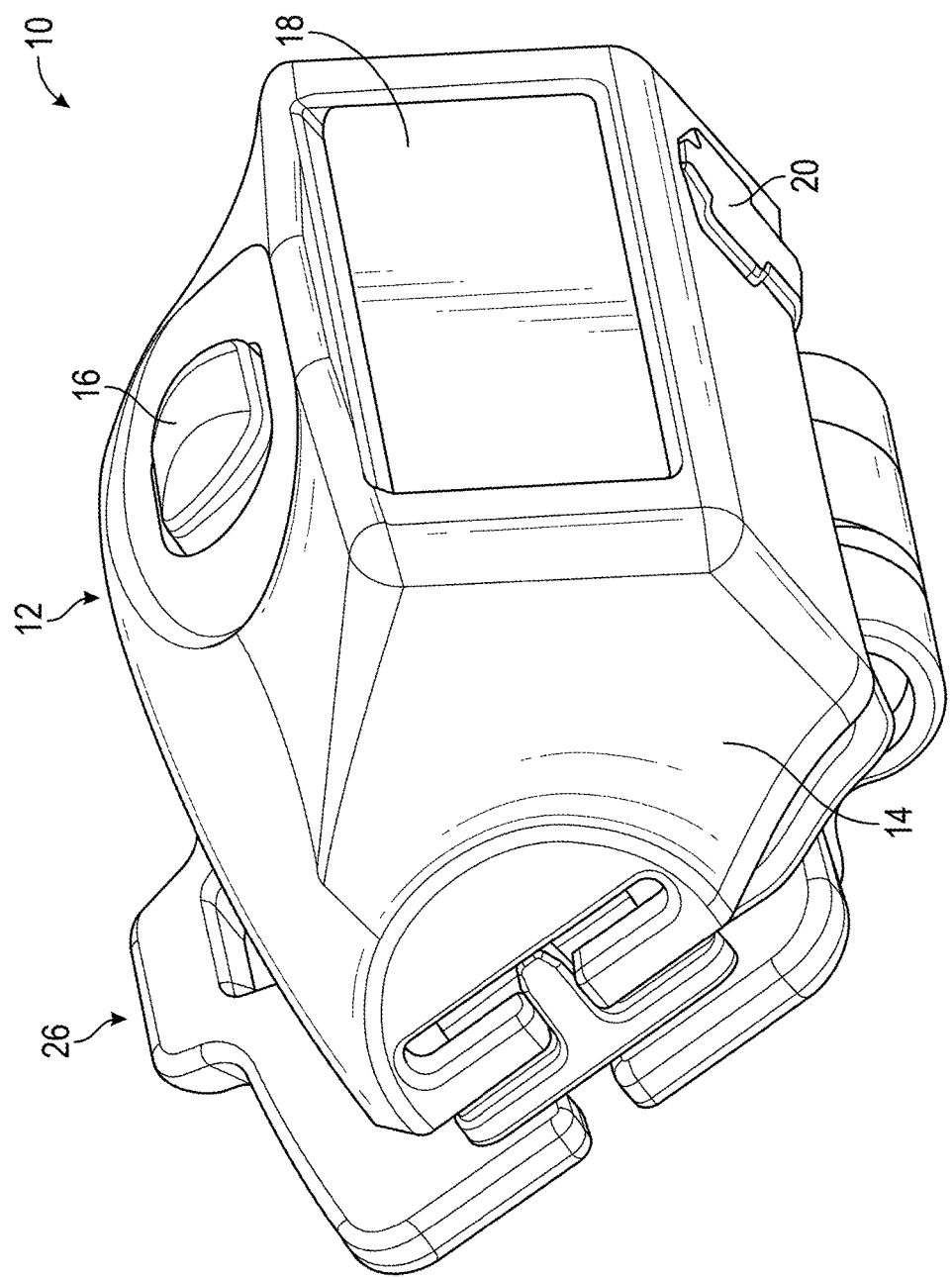
FIG. 1 is a perspective front view of an embodiment of a lighting device according to the present invention.
Figure 2:
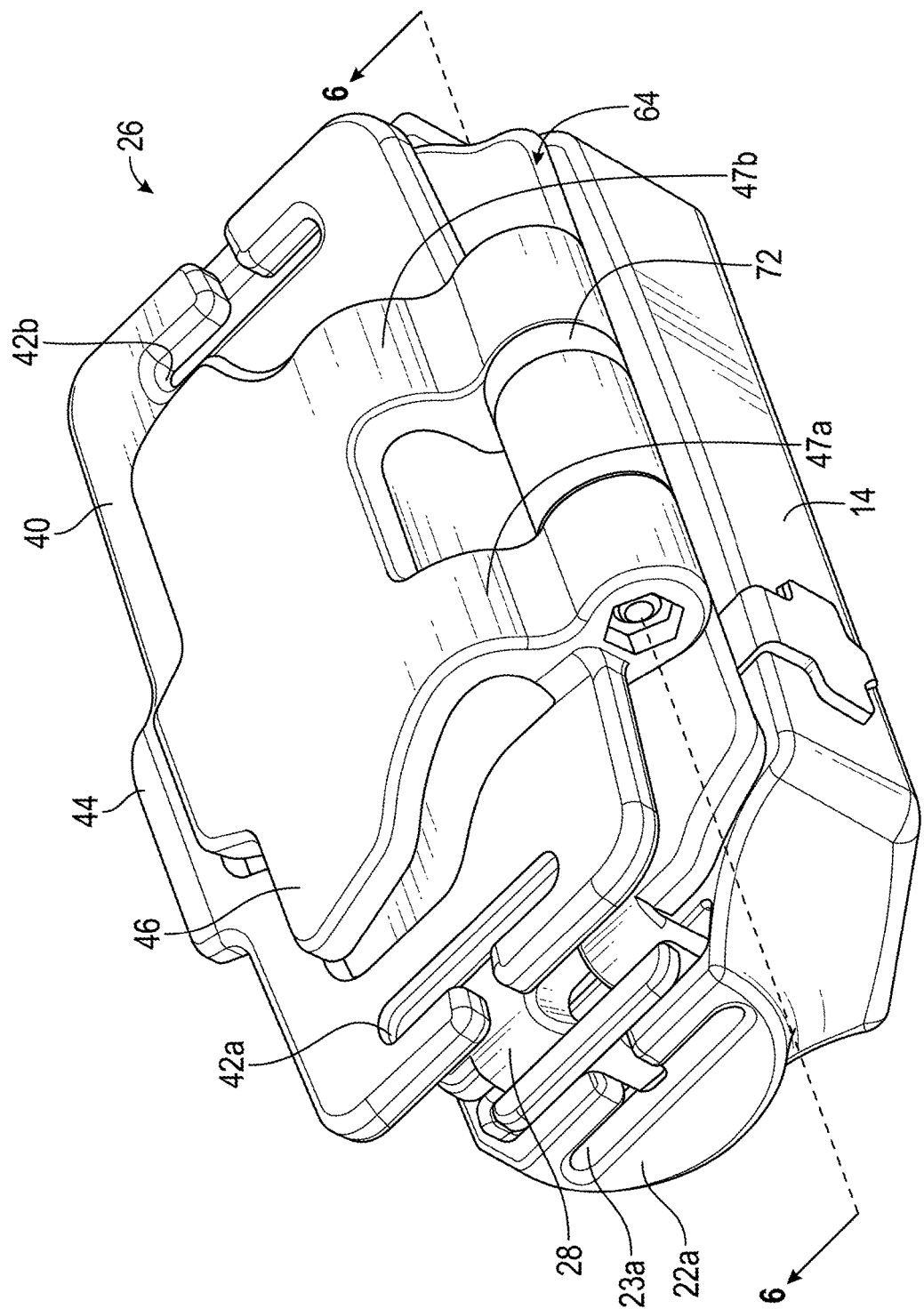
FIGS. 2 and 3 are perspective rear views thereof, showing portions of the bracket assembly of the lighting device.

The ensuing detailed description provides preferred exemplary embodiments only, and is not intended to limit the scope, applicability, or configuration of the herein disclosed inventions. Rather, the ensuing detailed description of the preferred exemplary embodiments will provide those skilled in the art with an enabling description for implementing the preferred exemplary embodiments in accordance with the herein disclosed invention. It is understood that various changes may be made in the function and arrangement of elements without departing from the spirit and scope of the invention, as set forth in the appended claims.

To aid in describing the invention, directional terms may be used in the specification and claims to describe portions of the present invention (intended to assist in describing and claiming the invention and are not intended to limit the invention in any way. In addition, reference numerals that are introduced in the specification in association with a drawing figure may be repeated in one or more subsequent figures without additional description in the specification, in order to provide context for other features.

Head-mountable or surface-mountable lighting devices are used in many applications where it is necessary or useful for a user to have their hands free, for example while walking, hiking, biking, or any other application in which additional light is desirable or necessary to accomplish the task and/or add to the safety of the user. Known mountable lighting devices have limited positionable freedom, and some include hinge joints that will fail over time due to the fastening pin working itself loose through repeated use. It is the desire of Applicant to disclose a mountable lighting device having an articulating friction hinge that is an improvement over those of known mountable lighting devices.

Referring now generally to FIGS. 1-6, an embodiment of a lighting device 10 according to the present invention will be described in detail. In this embodiment, the device 10 comprises a housing assembly 12 which includes a housing 14, an on/off button 16 that is used to turn the device 10 on and off or cycle through modes thereof, a light-emitting portion 18 (i.e., the lamp), and a charging port 20—which in this embodiment is a USB port—that is used to recharge the device 10. The functionality of the contents of the housing assembly 12 are outside the scope of the present specification and will not be described further.

In this embodiment, the device 10 further comprises a bracket assembly 26, which is removably mountable to the housing assembly 12 via a pair of bracket assembly mounting portions 22a,22b, which in this embodiment are located at the rear side edges of the housing 14. The bracket assembly 26 comprises a housing attachment leaf 28 which is used to connect the bracket assembly 26 to the housing 14, a surface mounting leaf 40 which is used to attach the bracket assembly 26—and thus the device 10—to a desired surface (e.g., the brim of a hat), and a hinge assembly 64 that rotatably attaches the housing attachment leaf 28 to the surface mounting leaf 40 about an axis of rotation 66 (see FIGS. 3 and 4).

Figure 5:
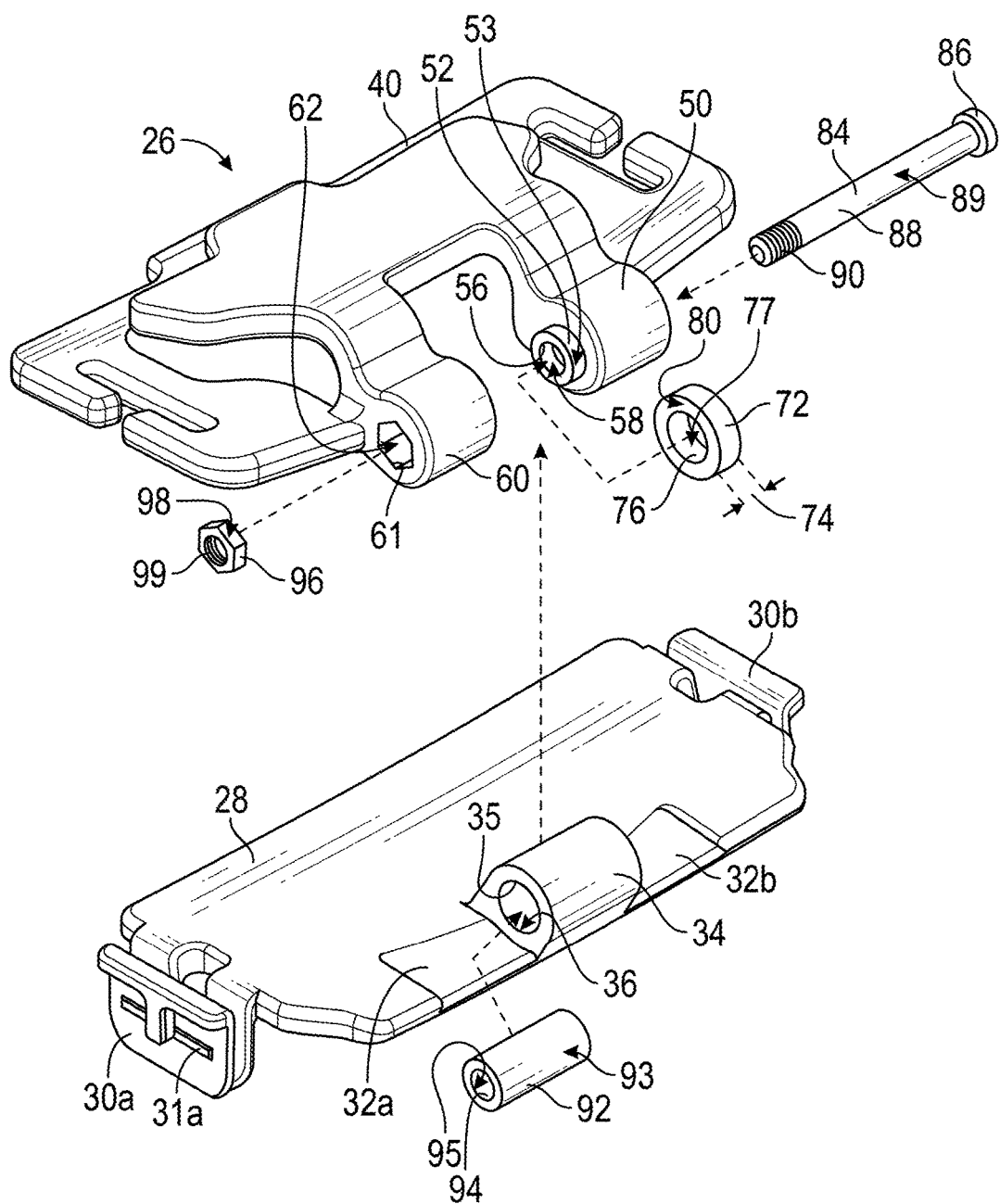
FIG. 5 is an exploded view of the bracket assembly of the lighting device of FIG. 1.

As seen in FIG. 5, the housing attachment leaf 28 comprises a pair of housing attachment portions 30a,30b that are used to attach the housing attachment leaf 28 to the housing 14 of the device 10. The housing attachment portions 30a,30b each comprise a deformable portion (not labeled) that may be compressed and inserted within a respective one of the bracket assembly mounting portions 22a,22b. Once inserted within the bracket assembly mounting portions 22a,22b and uncompressed, the housing attachment portions 30a,30b are releasably retained within the bracket assembly mounting portions 22a,22b via the interaction of locking tabs 31a,31b of the housing attachment portions 30a,30b with corresponding slots 23a,23b located in the bracket assembly mounting portions 22a,22b. In an alternate configuration of the device 10 of the present invention, the bracket assembly 26 may be omitted entirely and the slots 23a,23b in the housing 14 may be used to mount a headstrap (not shown) directly to the housing assembly 12. This configuration may be used, for example, when it is unnecessary to provide the device 10 with rotational freedom, or when it is desirable to have the device 10 be located as close as possible to the user's head.

As noted above, when the housing attachment leaf 28 is attached to the housing assembly 12, the surface mounting leaf 40 is rotatable about the axis of rotation 66 with respect to the housing assembly 12. The surface mounting leaf 40 comprises a first mounting portion 44 and a second mounting portion 46 that are attached together via a pair of deformable portions 47a,47b. The first mounting portion 44 and second mounting portion 46 are separated by a space 48, which has a fixed dimension when no pressure is acting on the second mounting portion 46. The dimension of the space 48 may be increased by inserting a mounting surface 2 having a dimension that is greater than the default dimension of the space 48 (see FIG. 4) between the first mounting portion 44 and second mounting portion 46. In this way, the inherent spring force provided by the deformable portions 47a,47b act on the second mounting portion 46 to clamp the surface mounting leaf 40 to the mounting surface 2. In this embodiment, the second mounting portion 46 of the surface mounting leaf 40 also comprises a pair of slots 42a,42b, which may be used to attach a headstrap or other mounting strap to the bracket assembly 26. Thus, the device 10 is provided with a wide variety of possible mounting options for the convenience of the user.

Figure 3:
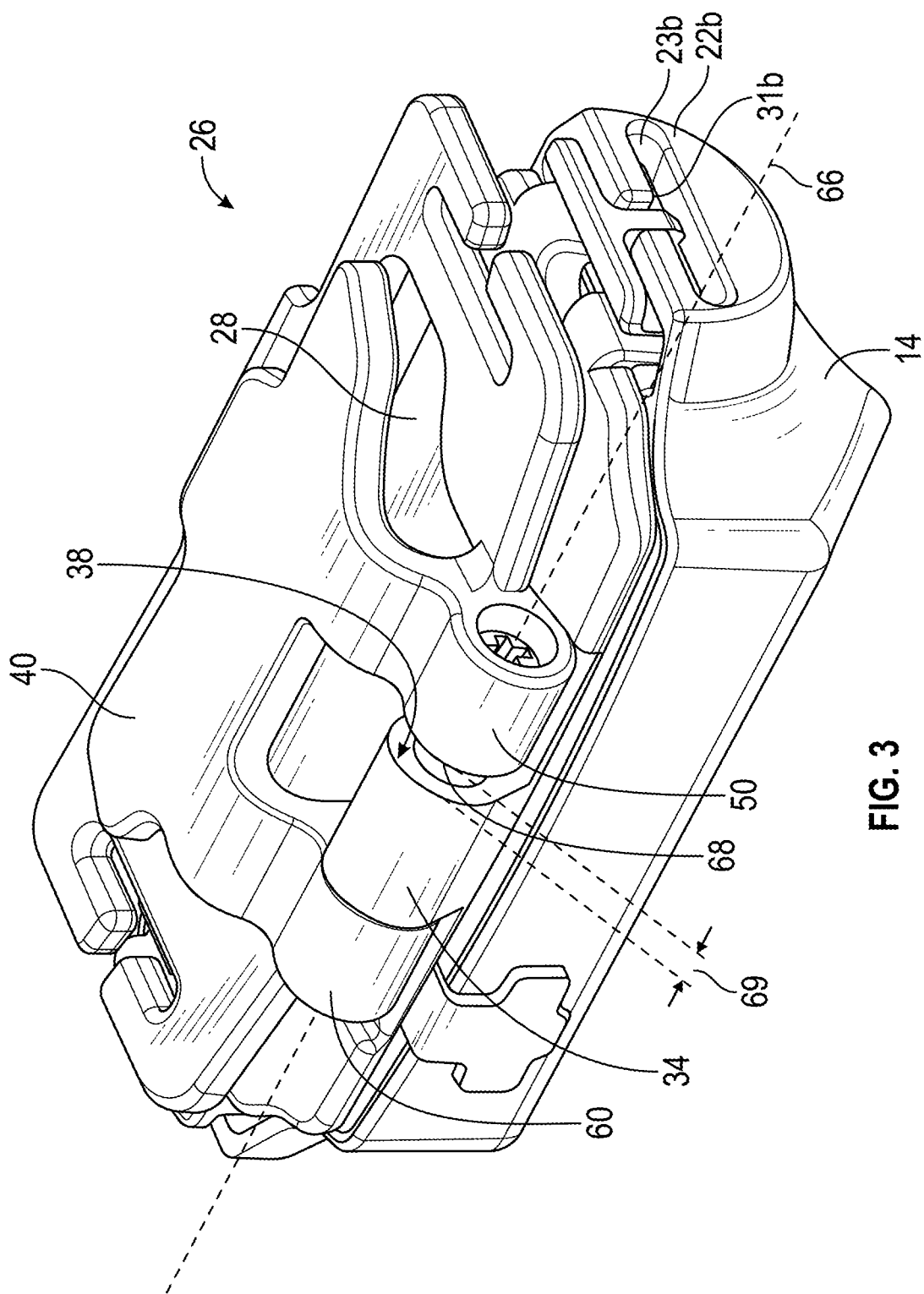
Figure 4:
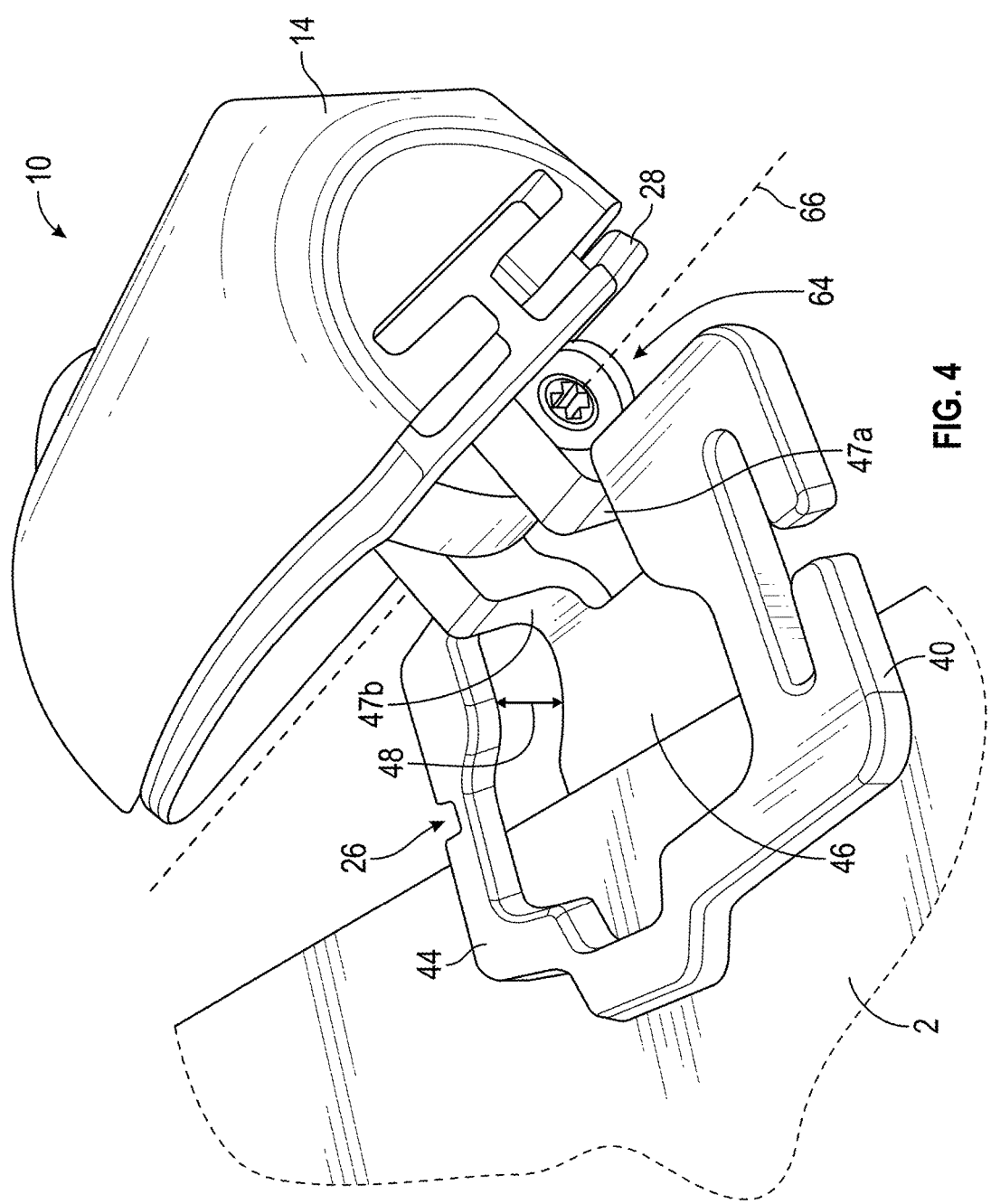
FIG. 4 is a perspective rear view thereof, showing the bracket assembly of the lighting device attached to a mounting surface and in an articulated position.

Once the bracket assembly 26 is affixed to a desired mounting surface (e.g., a hat brim or a workpiece), the hinge assembly 64 of the present invention is specially designed to permit the user to rotate the attached housing assembly 12 about the axis of rotation 66 to any desired rotational position within the full rotational range of the hinge assembly 64, as will be discussed below in further detail. FIGS. 3 and 4, for example, show the housing assembly 12 in different rotational positions. Once the desired rotational position has been selected, the hinge assembly 64 will maintain the housing assembly 12 in the selected position until the user readjusts the rotational position. The hinge assembly 64 according to the present invention thus permits for greater adjustability freedom than the known prior art devices.

The housing attachment leaf 28 further comprises a pair of cutouts 32a,32b and a knuckle 34 including an opening 35 and a side surface 38. The opening 35 in the knuckle 34 comprises an interior surface 36. The surface mounting leaf 40 further comprises a knuckle 50 and a knuckle 60. The knuckles 34,50,60 also form portions of the hinge assembly 64, as further described below. The cutouts 32a,32b in the housing attachment leaf 28 provide clearance for rotation of the knuckles 60,50, respectively, so that the hinge assembly 64 can properly rotate about the axis of rotation 66.

The knuckle 50 comprises a side surface 54 and a boss portion 52, the boss portion 52 extending outwardly from the remainder of the knuckle 50. The boss portion 52 includes an exterior surface 53. The knuckle 50 further comprises an opening 56 having an interior surface 58. The knuckle 60 comprises an opening 61 having an interior surface 62. In this embodiment, at least a portion of the opening 61 of the knuckle 60 is in the shape of a female hex head, to accommodate the fixed placement of a nut 96 therein in a non-rotational configuration.

The assembly method and functionality of the hinge assembly 64 will now be described in greater detail. In this embodiment, the hinge assembly 64 further comprises a washer 72, a bolt 84 which functions as the pin of the hinge assembly 64, a spacer 92, and a nut 96. In the present embodiment, the washer 72 is formed of rubber, although any suitably compressible material would suffice in alternate embodiments. The washer 72 has an uncompressed width 74 which is its width when not under pressure, an opening 76 having an interior surface 77, a first side surface 80, and a second side surface 82. The washer 72 is installed over the boss portion 52 of the knuckle 50, such that the interior surface 77 of the opening 76 in the washer 72 is placed in contact with the exterior surface 53 of the boss portion 52 and the second side surface 82 of the washer 72 is placed in contact with the side surface 54 of the knuckle 50. In this embodiment, the opening 76 in the washer 72 is appropriately sized such that it must be slightly spread to be installed onto the boss portion 52, and the washer 72 is thus held firmly on the boss portion 52 of the knuckle 50. In alternate embodiments, the opening 76 need not be so dimensioned so as to be firmly installed around the boss portion 52.

The spacer 92 is placed within the opening 35 in the knuckle 34, such that an exterior surface 93 of the spacer 92 is in contact with the interior surface 36 of the opening 35. In this embodiment, the spacer 92 is plastic, but it should be understood that other suitable materials, e.g., metals, nylon, or Delrin®, are also suitable. The spacer 92 further comprises an opening 94 having an interior surface 95. The nut 96, which comprises an exterior surface 98 and a threaded opening 99, is placed within the opening 61 in the knuckle 60, such that the exterior surface 98—which in this embodiment is a standard hexagonal cross-sectional shape—is placed in contact with the interior surface 62 of the opening 61 so that the nut 96 is not rotatable within the opening 61.

Figure 6:
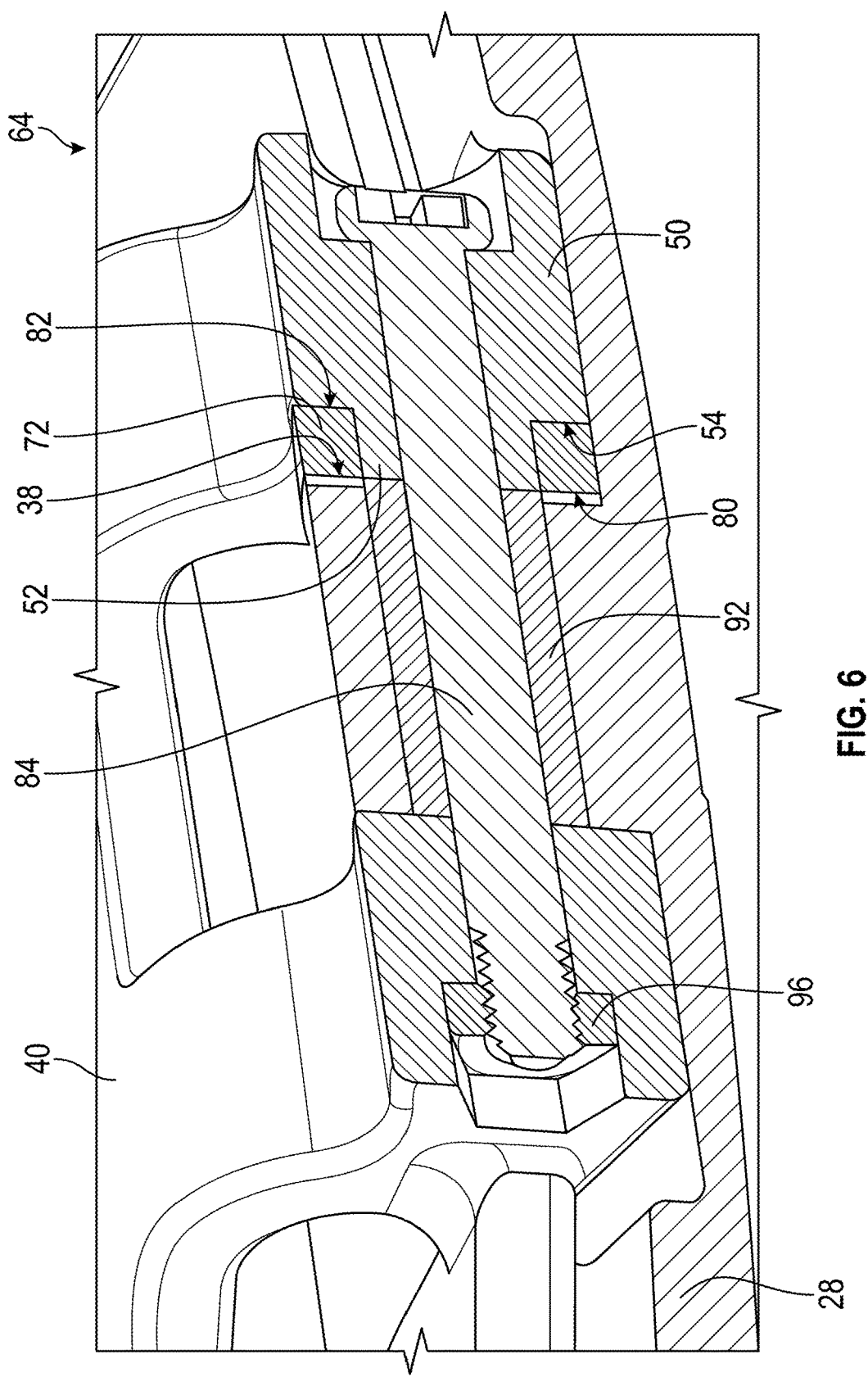
FIG. 6 is a sectional view taken along line 6-6 of FIG. 2, showing the hinge assembly of the lighting device in detail.

In this embodiment, the bolt 84 comprises a head 86 and a shaft 88 including an unthreaded exterior surface 89 and a threaded portion 90 at the end of the shaft 88. The bolt is routed through the opening 56 in the knuckle 50—including through the boss portion 52 thereof, around which the washer 72 is installed—then through the opening 94 in the spacer 92, which has been installed within the opening 35 in the knuckle 34, and finally through the opening 61 in the knuckle 60 and into the threaded opening 99 of the nut 96, so that the threaded portion 90 of the shaft 88 of the bolt 84 is fixedly secured within the threaded opening 99 in the nut 96. As seen in FIGS. 3, 4, and 6, once the bolt 84 is installed, the head 86 of the bolt 84 is retained exterior to the knuckle 50, and the unthreaded exterior surface 89 of the shaft 88 is within the hinge assembly 64 in a way that will not interfere with rotation of the surface mounting leaf 40 with respect to the housing attachment leaf 28.

Referring back to FIG. 3, in which the washer 72 has been omitted from view, a space 68 between the knuckles 34,50 is shown, the space 68 having a width 69 when the hinge assembly 64 is assembled. In this embodiment, the width 69 of the space 68 is smaller than the uncompressed width 74 of the washer 72 (see FIG. 5). When the hinge assembly 64 is assembled, the first side surface 80 of the washer is placed in contact with the side surface 38 of the knuckle 34, and as noted above the second side surface 82 of the washer 72 is placed in contact with the side surface 54 of the knuckle 50. When the hinge assembly 64 is assembled, due to the compressible nature of the material chosen for the washer 72, the width of the washer 72 is reduced to less than its uncompressed width 74 to fit within the width 69 of the space 68 between the knuckles 34,50. Since the deformed material of the washer 72 wants to return to its uncompressed width 74 due to its inherent spring force, the washer 72 thus applies pressure outwardly against the side surface 38 of the knuckle 34 and the side surface 54 of the knuckle 50. In this embodiment, the bolt 84 and nut 96 function only to maintain the hinge assembly 64 in an assembled configuration, and are not relied on to supply friction to the hinge assembly 64. Stated another way, the washer 72 provides all of the pressure on the hinge assembly 64 necessary to maintain the housing attachment leaf 28 (and attached housing assembly 12) and the surface mounting leaf 40 in a desired rotational configuration with respect to another.

In this embodiment, the uncompressed width 74 of the washer 72 is approximately 15% greater than the width 69 of the space 68 between the knuckles 34,50 into which it is located and compressed. In alternate embodiments, the uncompressed width of the washer may be between 10-20%, 5-25%, or 2.5-35% larger than the space into which it is fit within knuckles of opposing leaves of the hinge assembly. Said another way, in the embodiment shown in the Figures, the uncompressed width 74 of the washer 72 is reduced by approximately 13% such that the washer 72 fits within the space 68 between the knuckles 34,50. In alternate embodiments, the uncompressed width of the washer may be reduced by approximately 5-20%, or more preferably between 10-15%, such that the washer fits within the space between the knuckles.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. A lighting device that is releasably mountable to a mounting surface, the lighting device comprising:
    a housing assembly comprising at least one light-emitting portion; and
    a bracket assembly comprising a first leaf that is releasably attachable to the housing assembly and including a first knuckle, a second leaf that is releasably attachable to the mounting surface and including a second knuckle, and a hinge assembly that rotatably connects the first leaf to the second leaf about an axis of rotation, the hinge assembly comprising the first knuckle, the second knuckle, a pin routed between the first knuckle and the second knuckle along the axis of rotation, and a washer located between the first knuckle and the second knuckle, the washer being centered about the axis of rotation and having a center opening that at least partially surrounds the pin, the washer being comprised of a deformable material, the washer having an uncompressed width when not under pressure,
    wherein when the hinge assembly is assembled, a space is provided between the first knuckle and the second knuckle, the space having a width that is smaller than the uncompressed width of the washer, such that the washer is compressed within the space such that it supplies pressure against both of the first knuckle and the second knuckle.

2. The lighting device of claim 1, wherein the pin does not provide any frictional force to the hinge assembly in a direction parallel to the axis of rotation.

3. The lighting device of claim 2, wherein the pin comprises a threaded fastener and a nut.

4. The lighting device of claim 1, wherein the pin comprises a threaded fastener and a nut.

5. The lighting device of claim 1, wherein the center opening of the washer fully surrounds the pin.

6. The lighting device of claim 1, wherein one of the first knuckle or the second knuckle comprises a main portion and a boss portion that extends outwardly from the main portion thereof towards the other of the first knuckle or the second knuckle, the boss portion having an opening aligned along the axis of rotation that at least partially surrounds the pin, the center opening of the washer at least partially surrounding the boss portion.

7. The lighting device of claim 6, wherein the center opening of the washer has a diameter when the washer is not installed around the boss portion that is smaller than a diameter of the boss portion, such that the center opening must be enlarged to install the washer around the boss portion, and such that the washer supplies pressure to the boss portion when installed thereon to hold the washer firmly in place.

8. The lighting device of claim 1, wherein the uncompressed width of the washer is between 5%-25% greater than the width of the space between the first knuckle and the second knuckle.

9. The lighting device of claim 1, wherein the uncompressed width of the washer is between 10%-20% greater than the width of the space between the first knuckle and the second knuckle.

10. The lighting device of claim 1, wherein the uncompressed width of the washer is approximately 15% greater than the width of the space between the first knuckle and the second knuckle.

11. The lighting device of claim 1, further comprising a spacer located within an opening in the first knuckle or the second knuckle, the spacer having an opening therein through which the pin is routed along the axis of rotation.

12. The lighting device of claim 11, wherein the other of the first knuckle or the second knuckle comprises a main portion and a boss portion that extends outwardly from the main portion thereof towards the knuckle including the spacer, the boss portion having an opening aligned along the axis of rotation that at least partially surrounds the pin, the center opening of the washer at least partially surrounding the boss portion.

13. The lighting device of claim 1, the hinge assembly comprising a third knuckle that is part of the first leaf or second leaf.

14. A method of assembling a hinge assembly of a bracket assembly for releasably mounting a housing assembly comprising at least one light-emitting portion to a mounting surface, the method comprising:
    placing a first side of a first knuckle of a first leaf that is releasably attachable to the housing assembly adjacent to a first side of a washer having a center opening, the washer being comprised of a deformable material, the washer having an uncompressed width when not under pressure;
    placing a first side of a second knuckle of a second leaf that is releasably attachable to the mounting surface adjacent to a second side of the washer such that the washer is compressed between the first knuckle and the second knuckle, the second side of the washer opposing the first side of the washer;
    inserting a pin through the first knuckle, the center opening of the washer, and the second knuckle about an axis of rotation of the hinge assembly; and
    securing the pin in place to complete the hinge assembly such that the pin does not supply any frictional force to the hinge assembly in a direction parallel to the axis of rotation.

15. The method of claim 14, further comprising compressing a width of the washer between the first knuckle and the second knuckle by between 5-20%.

16. The method of claim 14, further comprising compressing the width of the washer between the first knuckle and the second knuckle by between 10-15%.

17. The method of claim 14, further comprising the steps of:
provaiding one of the first knuckle or the second knuckle with a main portion and a boss portion that extends outwardly from the main portion thereof towards the other of the first knuckle or the second knuckle, the boss portion having an opening aligned along the axis of rotation that at least partially surrounds the pin; and
placing the center opening of the washer such that it at least partially surrounds the boss portion.

18. The method of claim 17, further comprising the step of providing the center opening of the washer with a diameter when the washer is not installed around the boss portion that is smaller than a diameter of the boss portion, such that the center opening must be enlarged to install the washer around the boss portion, and such that the washer supplies pressure to the boss portion when installed thereon to hold the washer firmly in place.

19. The method of claim 17, further comprising the step of inserting a spacer within an opening in the other of the first knuckle or the second knuckle not including the boss portion, the spacer having an opening therein through which the pin is routed along the axis of rotation.

20. The method of claim 14, further comprising the step of inserting a spacer within an opening in the first knuckle or the second knuckle, the spacer having an opening therein through which the pin is routed along the axis of rotation.

* * * * *